United States Patent
Kuroda

(10) Patent No.: US 6,647,962 B2
(45) Date of Patent: Nov. 18, 2003

(54) OUTBOARD MOTOR WITH INTERNAL COMBUSTION ENGINE

(75) Inventor: Tatsuya Kuroda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/165,316

(22) Filed: Jun. 10, 2002

(65) Prior Publication Data

US 2003/0010318 A1 Jan. 16, 2003

(30) Foreign Application Priority Data

Jul. 12, 2001 (JP) ........................................ 2001-212662

(51) Int. Cl.$^7$ ................................................ F02B 15/00
(52) U.S. Cl. ..................................... 123/432; 123/90.16
(58) Field of Search ............................. 123/432, 90.16, 123/429, 90.15, 90.1

(56) References Cited

U.S. PATENT DOCUMENTS

| | | | |
|---|---|---|---|
| 5,231,964 A | 8/1993 | Harada | 123/306 |
| 5,515,820 A | 5/1996 | Sugimoto et al. | 123/90.16 |
| 5,852,994 A | * 12/1998 | Tsuzuku et al. | 123/308 |
| 5,855,193 A | 1/1999 | Takahashi | 123/184.48 |

FOREIGN PATENT DOCUMENTS

| | | |
|---|---|---|
| EP | 0391739 A1 | 10/1990 |
| EP | 1001160 A2 | 5/2000 |
| JP | 4-94433 | 3/1992 |
| JP | 2000-186516 | 7/2000 |

\* cited by examiner

*Primary Examiner*—Bibhu Mohanty
(74) *Attorney, Agent, or Firm*—Armstrong, Westerman & Hattori, LLP

(57) ABSTRACT

An outboard motor includes an internal combustion engine provided with a pair of intake valves. The opening and closing operation of one of the intake valves can be paused. The internal combustion engine comprises a vertical crankshaft, a cylinder head provided with an intake port having a pair of intake openings for one combustion chamber, and a fuel injection valve for injecting the fuel into the intake port. The intake port has an upper branch section and a lower branch section extended under the upper branch section. A valve train includes a valve-operation mode changing mechanism. The valve-operation mode changing mechanism pauses the opening and closing operation of the first intake valve and operates the second intake valve for opening and closing the lower intake opening of the lower branch section while the internal combustion engine is operating at engine speeds in a low-speed range. Thus, the amount of the stagnant fuel staying on the wall surface of the intake port can be reduced, variation of the air-fuel ratio can be suppressed, and the stability of combustion can be improved.

5 Claims, 10 Drawing Sheets

OUTBOARD MOTOR WITH INTERNAL COMBUSTION ENGINE

BACKGROUND OF THE INVENTION

1. Field of the Invention

The present invention relates to an outboard motor provided with an internal combustion engine including a vertical crankshaft, a pair of intake valves for opening and closing a pair of intake openings opening into a combustion chamber, a valve-operation mode changing mechanism for pausing the opening closing operation of one of the intake valves, and a fuel supply system for supplying a liquid fuel into an air intake passage connected to the pair of intake openings.

2. Description of the Related Art

A prior art outboard motor provided with an internal combustion engine having a valve-operation mode changing mechanism for changing the operating mode of a pair of intake valves according to the operating condition of the internal combustion engine is disclosed in JP-A-186516/2000. This prior art outboard motor is provided with an internal combustion engine having a vertical crankshaft, a valve train, and a fuel injection valve. The valve train includes a camshaft provided with cams respectively having different lifts, a pair of intake rocker arms for transmitting the rotation of the cams to a pair of intake valves placed in intake ports, a pair of exhaust rocker arms for transmitting the rotation of the cams to a pair of exhaust valves placed in exhaust ports, and a power-cutoff mechanism for cutting off power transmission from the cams to the intake rocker arms. The power-cutoff mechanism enables the valve train to operate the pair of intake valves selectively in one of four operating modes.

A prior art internal combustion engine disclosed in JP-A-94433/1992 has a pair of intake valves for opening and closing a pair of intake ports, a valve-operation mode changing mechanism capable of substantially pausing the opening and closing operation of one of the pair of intake valves, and a fuel injection valve. In this prior art internal combustion engine, swirls are generated in the combustion chamber to promote combustion for improving combustion efficiency while the opening and closing operation of one of the intake valves are made to pause.

Incidentally, a valve-operation mode changing mechanism capable of controlling the valve train of an internal engine included in an outboard motor such that the opening and closing operation of one of the pair of intake valves are made to pause substantially may be employed to improve combustion efficiency by generating swirls in the combustion chamber of the internal combustion engine in order to improve fuel consumption through lean-burn combustion. When such a valve-operation mode changing mechanism is employed, the reduction of the quantity of fuel adhering to a part of the internal combustion engine around the intake port closed by the paused intake valve is important for stable combustion.

While the internal combustion engine is operating with one of the intake valves held in an idle state, the fuel injected by a fuel injection valve adheres to a wall around the intake port closed by the intake vale held in an idle state and, although a part of the fuel enters the combustion chamber through a gap formed between the wall and the slightly opened intake valve, a large quantity of the fuel stays on the wall around the intake port.

When the quantity of the fuel that stays on the wall surface of the intake port (hereinafter, referred to as "quantity of the stagnant fuel") increases, air-fuel ratio is liable to vary according to the quantity of the stagnant fuel, making combustion unstable. When a lean-mixture of a higher air-fuel ratio is used for lean-burn operation, the variation of the air-fuel ratio affects the stability of combustion greatly.

The present invention has been made in view of the foregoing circumstances and it is therefore an object of the present invention to provide an outboard motor provided with an internal combustion engine having a pair of intake valves and capable of pausing the opening and closing operation of one of the pair of intake valves, and of reducing the quantity of the stagnant fuel on the surface of an intake port provided with the paused intake valve to suppress the variation of the air-fuel ratio and to improve the stability of combustion.

SUMMARY OF THE INVENTION

With the object in view, the present invention provides an outboard motor provided with an internal combustion engine comprising: a vertical crankshaft; a cylinder head provided, for one combustion chamber, with an intake port terminating in a pair of intake openings, and an exhaust port terminating in exhaust openings; a pair of intake valves for opening and closing the pair of intake openings; a pair of exhaust valves for opening and closing the exhaust openings; a valve train for operating the pair of intake valves) and the pair of exhaust valves for opening and closing operation; and a fuel supply device for supplying a liquid fuel into an air intake passage connected to the pair of intake openings; wherein the intake port has a main section, an upper branch section branching from a downstream end of the main section, and a lower branch section branching from the downstream end of the main section and extending below the upper branch section; the pair of intake openings are an upper intake opening of the upper branch section, and a lower intake opening of the lower branch section, respectively; the pair of intake valves are a first intake valve for opening and closing the upper intake opening, and a second intake valve for opening and closing the lower intake opening, respectively; the valve train includes a valve-operation mode changing mechanism capable of changing the respective operating modes of the first and the second intake valve according to engine speed; and the valve-operation mode changing mechanism has a mode selecting system for making the valve-operation mode changing mechanism pause the opening and closing operation of the first intake valve, hold the first intake valve at its closed position and operate the second intake valve for opening and closing operation while the internal combustion engine is operating at engine speeds in a low-speed range.

According to the present invention, while the internal combustion engine included in the outboard motor is operating at engine speeds in a low-speed operating mode, the upper intake opening is kept closed by the paused first intake valve made to pause by the valve-operation mode changing mechanism, and the lower intake opening is opened and closed by the second intake valve to generate swirls in the combustion chamber. Part of the fuel supplied into the intake port flows into the upper branch section and adheres to a wall defining the upper branch section. However, part of the fuel adhering to the wall of the upper branch section collects in a lower part of the upper branch section, and part of the fuel connected in the lower part of the upper branch section flows into the lower branch section and can be easily sucked through the lower intake opening when the second intake valve is opened. Thus, the fuel collected in the upper branch section can be sucked into the combustion chamber more easily than the fuel which may be collected in the lower branch section if the operations of the second intake valve for opening and closing the lower intake opening are made to pause, so that the quantity of the stagnant fuel on the wall of the upper branch section is small.

Thus, the present invention has the following effects. Since the quantity of the stagnant fuel on the wall surface of the upper branch section while the internal combustion engine is operating in a low-speed operating mode in which the operations of the first intake valve are made to pause is reduced, the variation of the air-fuel ratio dependent on the quantity of the stagnant fuel is suppressed and hence stability of combustion is improved. Since swirls are generated to improve combustion, the combustion of a lean air-fuel mixture is possible, which improves fuel consumption rate.

Preferably, an upstream projecting partition wall is formed between the upper branch section and the lower branch section of the intake port. Preferably, the partition wall has inclined upper and lower surfaces.

The valve train may include a first rocker arm for opening and closing the first intake valve, and a second rocker arm for opening and closing the second intake valve, the mode selecting system may interlock the first and the second rocker arm so that the first and the second rocker arm operate synchronously for opening and closing operation while the internal combustion engine is operating at engine speeds in a high-speed range, and the first and the second rocker arms may be disconnected to enable the first rocker arm to pause the opening and closing operation of the first intake valve independently of the operation of the second rocker arm while the internal combustion engine is operating at engine speeds in a low-speed range.

Such operations of the first and the second rocker arm may be achieved by using a mode selecting means which can be set in either a high-speed mode selecting state for a high-speed range for high engine speeds or a low-speed mode selecting state for a low-speed range for low engine speeds according to the engine speed of the internal combustion engine, and an interlocking means capable of interlocking the first and the second rocker arm when the mode selecting means is set in the low-speed mode selecting state.

DESCRIPTION OF THE PREFERRED EMBODIMENTS

A preferred embodiment of the present invention will be described with reference to FIGS. 1 to 12, in which words "front, rear, right and left" signify front, rear, right and left with respect to a boat on which the outboard motor is mounted unless otherwise specified. The pause of the opening and closing operation of an intake valve is a state where the intake valve is held at a closed position by a pausing cam regardless of the angular position of a camshaft or a state where the intake valve is opened slightly by a lobe of the pausing cam and is substantially closed.

Figure 1:
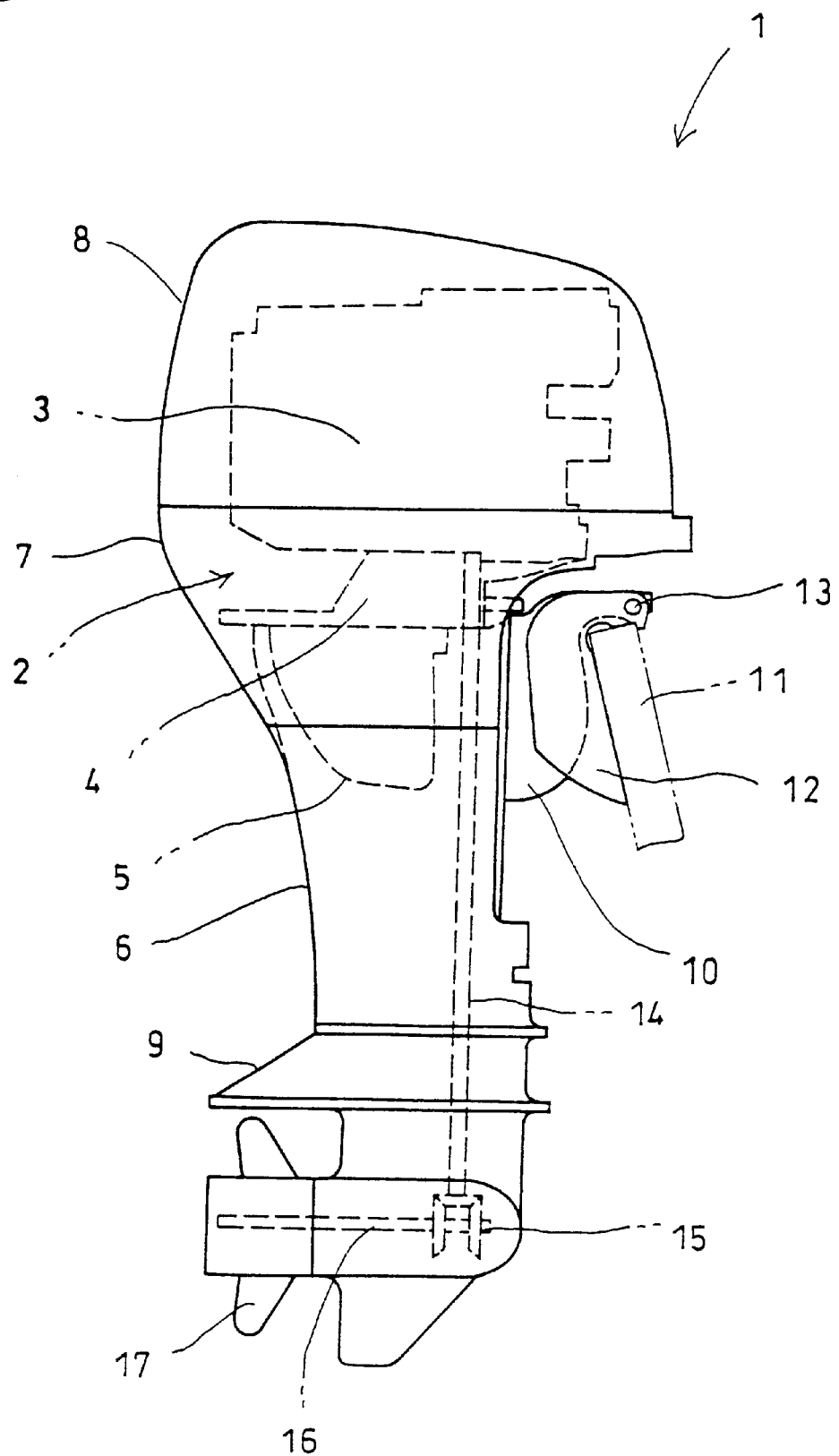
FIG. 1 is a side elevation of an outboard motor with an internal combustion engine in a preferred embodiment of the present invention.
Figure 2:
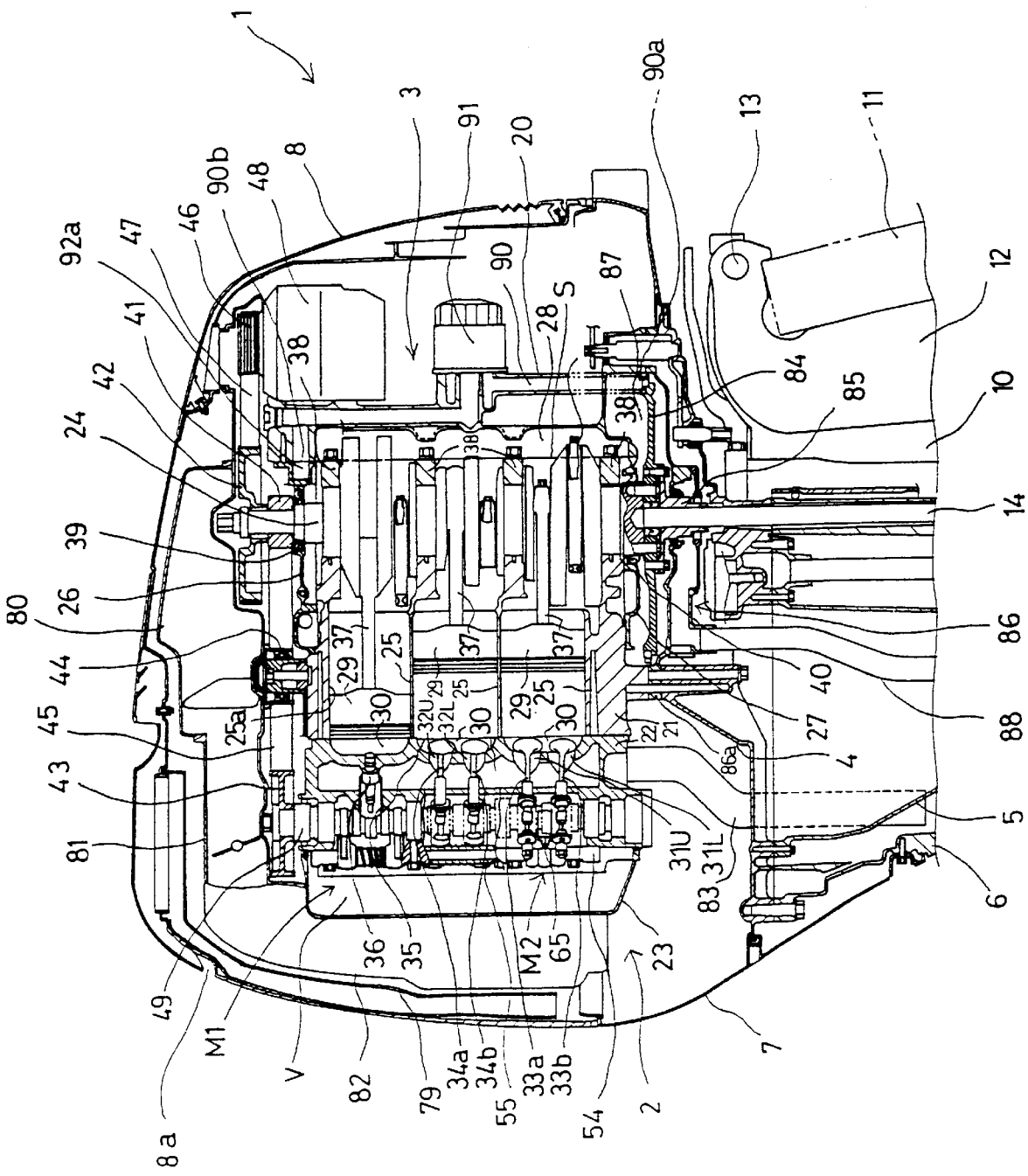
FIG. 2 is a sectional view of an essential part of the outboard motor shown in FIG. 1, in a vertical plane including the axis of a crankshaft and the center axes of cylinders on a left bank.

Referring to FIG. 1 showing an outboard motor 1 in a preferred embodiment according to the present invention, the outboard motor 1 is provided with an internal combustion engine 2 having a vertical crankshaft 24 (FIG. 2). The engine unit 3 of the internal combustion engine 2 is mounted on a mount case 4. An oil pan 5 and an extension case 6 capable of housing the oil pan 5 are connected to the lower end of the mount case 4. An upper cover 7 is connected to an upper part of the extension case 6, and an engine cover 8 is connected to the upper end of the under cover 7 so as to cover the internal combustion engine 2. The under cover 7 and the engine cover 8 defines an engine room for accommodating the engine unit 3. A gear case holding a forward-reverse selecting device 15 is joined to the lower end of the extension case 6.

A swivel shaft, not shown, fixedly attached to the mount case 4 of the outboard motor 1 is supported for turning about a vertical axis on a swivel case 10. The swivel case 10 is supported for turning in a vertical plane on a tit shaft 13 fixed to an upper part of a stern bracket 12 fixed to the stern of a hull 11. The outboard motor 1 can be turned in a horizontal plane on the swivel shaft and can be turned in a vertical plane on the tilt shaft 13.

A drive shaft 14 is connected to a lower end part of the crankshaft 24. The drive shaft 14 is extended vertically through the extension case 6 to the gear case 9. A lower end part of the drive shaft 14 is connected to a propeller shaft 16 holding a propeller 17 by the forward-reverse selecting device 15. The power of the internal combustion engine 2 is transmitted through the crankshaft 24, the drive shaft 14, the forward-reverse selecting device 15 and the propeller shaft 16 to the propeller 17 to drive the propeller 17 for rotation.

Referring to FIG. 2, the internal combustion engine 2 is a water-cooled SOHC four-stroke-cycle V-6 engine. The engine unit 3 comprises a crankcase 20, a cylinder block 21, a cylinder head 22 for each of the banks, a valve cover 23 for each of the banks, an upper sealing cover 26, which will be described later, and a lower sealing cover, which will be described later. The crankcase 20, the cylinder block 21, the cylinder head 22 and the valve cover 23 are arranged successively in that order in a direction from the bow toward the stern of the hull 11 and are assembled to build the engine unit 3.

The pair of banks of the cylinder block 21 are set at an angle in a V-shape so as to diverge from each other toward the rear. Each of the banks is provided with three cylinders 25 vertically arranged in parallel to the crankshaft 24. The cylinder block 21 has right and left side walls extended toward the front beyond the axis of rotation of the crankshaft 24 to form a deep skirt having a joining surface S to which the crankcase 20 is joined on the side of the crankcase 20 with respect to the axis of rotation of the crankshaft 24. The cylinder block 21 is the so-called deep-skirt cylinder block. The upper sealing cover 26 and the lower sealing cover provided with openings through which the crankshaft 24 extends are set on the upper and the lower wall, respectively, of the cylinder block 21 in a plane including the joining surface S, and are fastened to the cylinder block 21 and the crankcase 20 with bolts. Thus, the upper and the lower wall of the crankcase 20 are fastened to the upper sealing cover 26 and the lower sealing cover 27, respectively, with bolts, and the right and the left side wall of the crankcase are fastened to the cylinder block 21 with bolts. The cylinder block 21, the sealing covers 26 and 27 and the crankcase 20 define a crank chamber 28.

Figure 3:
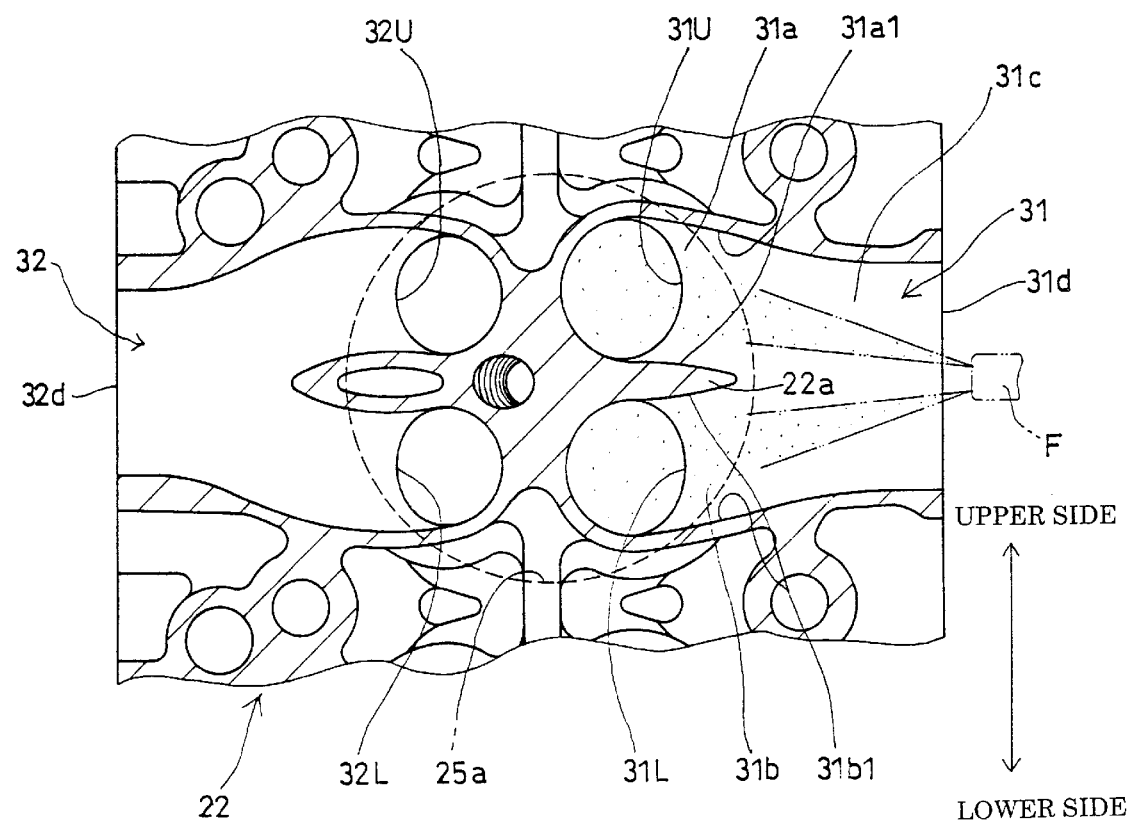
FIG. 3 is a sectional plan view of a part of a cylinder head corresponding to one of the cylinders of the left bank of the internal combustion engine included in the outboard motor shown in FIG. 1.

Referring to FIGS. 2 and 3, the cylinder head 22 of each bank is provided, for each cylinder 25, with an intake port 31 having an upper intake opening 31U and a lower intake opening 31L, i.e., a pair of intake openings, opening into a combustion chamber 30 formed between the cylinder head 22 and a piston 29 fitted in the cylinder bore 25a for axial sliding, and an exhaust port 32 having an upper exhaust opening 32U and a lower exhaust opening 32L, i.e., a pair of exhaust openings, opening into the combustion chamber 30. A first intake valve 33a and a second intake valve 33b, i.e., a pair of intake valves, respectively for opening and closing the intake openings 31U and 31L, and a first exhaust valve 34a and a second exhaust valve 34b, i.e., a pair of exhaust valves, for opening and closing the exhaust openings 32U and 32L are placed on a part corresponding to each cylinder 25 of the cylinder head 22, and a spark plug 36 is attached to the same part of the cylinder head 22 with the axis thereof directed toward a central part of the combustion chamber 30.

Referring to FIG. 3, each suction port 31 has an upstream opening 31d to be connected to a downstream opening of an intake manifold, not shown. The intake port 31 is divided into two branch sections, i.e., an upper branch section 31a and a lower branch section 31b, respectively terminating in the upper intake opening 31U and the lower intake opening 31L by a partition wall 22a formed integrally with the cylinder head 22. Thus, the intake port 31 has a main section 31c extending on the upstream side of the partition wall 22a, the upper branch section 31a, and a lower branch section 31b separated from the upper branch section 31a by the partition wall 22a and extending under the upper branch section 31a. The partition wall 22a has an upper surface 31a1 and a lower surface 31b1. The upper surface 31a1 and the lower surface 31b1 extend obliquely so as to converge on an edge and to make upper intake opening 31U and the lower intake opening 31L lie on a vertical line.

Referring again to FIG. 2, the piston 29 is connected to the crankshaft 24 by a connecting rod 37. The piston 29 reciprocates to drive the crankshaft 24 for rotation. The crankshaft 24 has four journals supported in plain bearings held between the cylinder block 21 and bearing caps 38. Thus, the crankshaft 24 is supported for rotation on the cylinder block 21. The cylinder block 21, and the bearing caps 38 form bearing parts for supporting the crankshaft 24. Oil seals 39 and 40 are put on parts defining the openings of the upper sealing cover 26 and the lower sealing cover 27 to seal spaces between parts extending through the openings of upper sealing cover 26 and the lower sealing cover 27 of the crankshaft 24, and the upper sealing cover 26 and the lower sealing cover 27, respectively.

A first drive pulley 41 and a second drive pulley 42 are mounted on an upper end part of the crankshaft 24 projecting upward from the upper sealing cover 26 serving as one of the members defining the crank chamber 28. The first drive pulley 41 is on the side of the upper sealing cover 26 and the second drive pulley 42 is disposed above the first drive pulley 41. A timing belt 45 is wound around the first drive pulley 41, a pair of first driven pulleys 43 attached to upper end parts of a pair of camshafts 49 vertically supported for rotation on the cylinder heads 22 of the banks, and an idle pulley 44. The camshafts 49 of the banks are driven through the timing belt 45 by the first drive pulley 41 for rotation at a rotating speed equal to half the rotating speed of the crankshaft 24. A drive belt 47 is wound around the second drive pulley 42 and a second driven pulley 46 attached to an upper end part of the rotor shaft of an alternator 48. The crankshaft 24 drives the rotor shaft of the alternator 48 for rotation through the drive belt 47.

In each bank, a valve train M1 including the vertical camshaft 49, rocker-arm shafts 54 and 55 parallel to the camshaft 49, and rocker arms supported for swing motion on the rocker-arm shafts 54 and 55 and driven for rocking motion by the cams of the camshaft 49 is disposed in a valve train chamber V defined by the cylinder head 22 and the valve cover 23. The valve train M1 further includes a valve-operation mode changing mechanism M2 for changing the operating mode of the pair of intake valves 33a and 33b, i.e., the lift and the opening period, according to engine speed.

Figure 4:
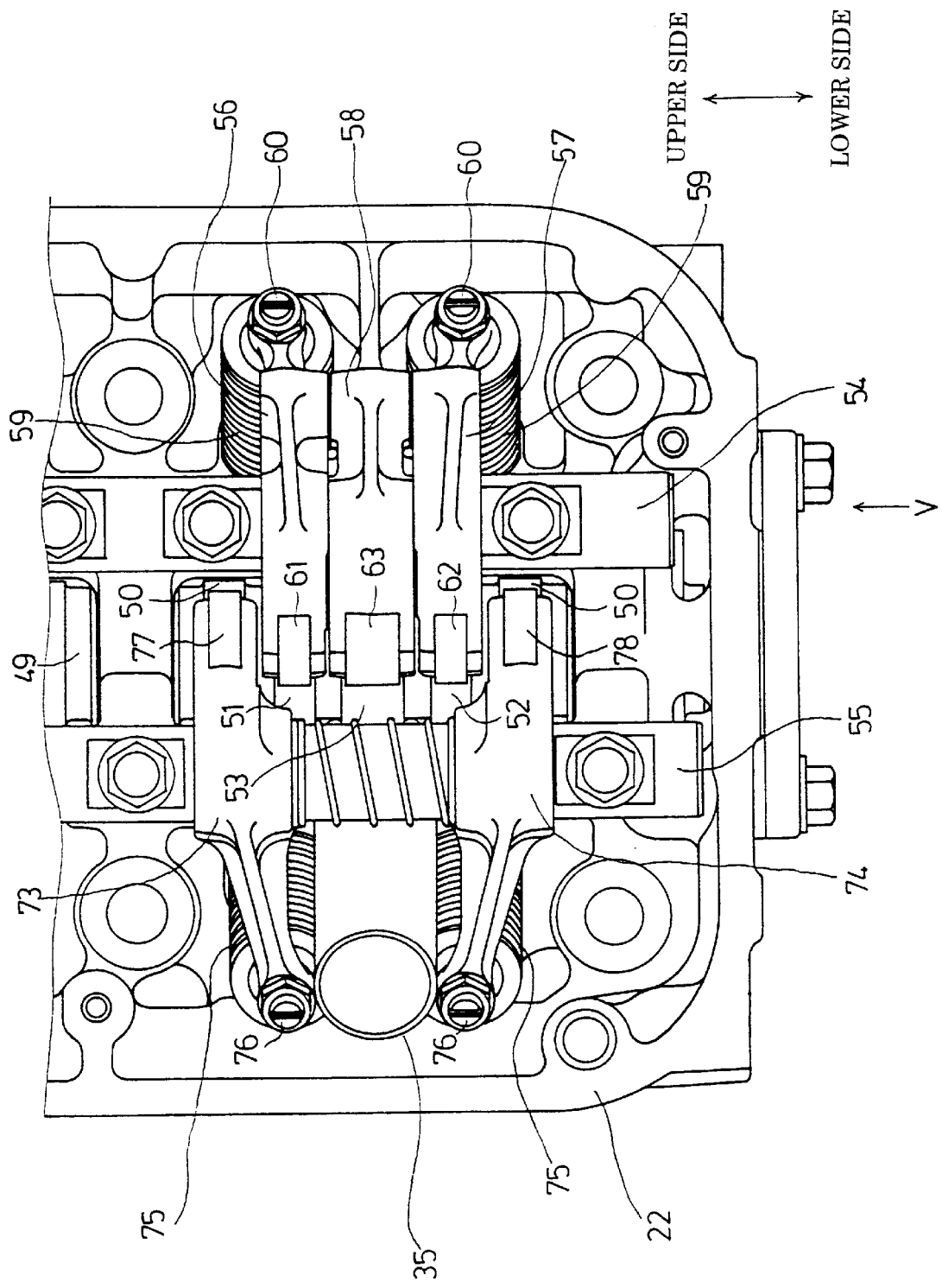
FIG. 4 is a rear view of an essential part of the cylinder head of the left bank of the internal combustion engine of the outboard motor shown in FIG. 1, in which a valve cover is removed.
Figure 5:
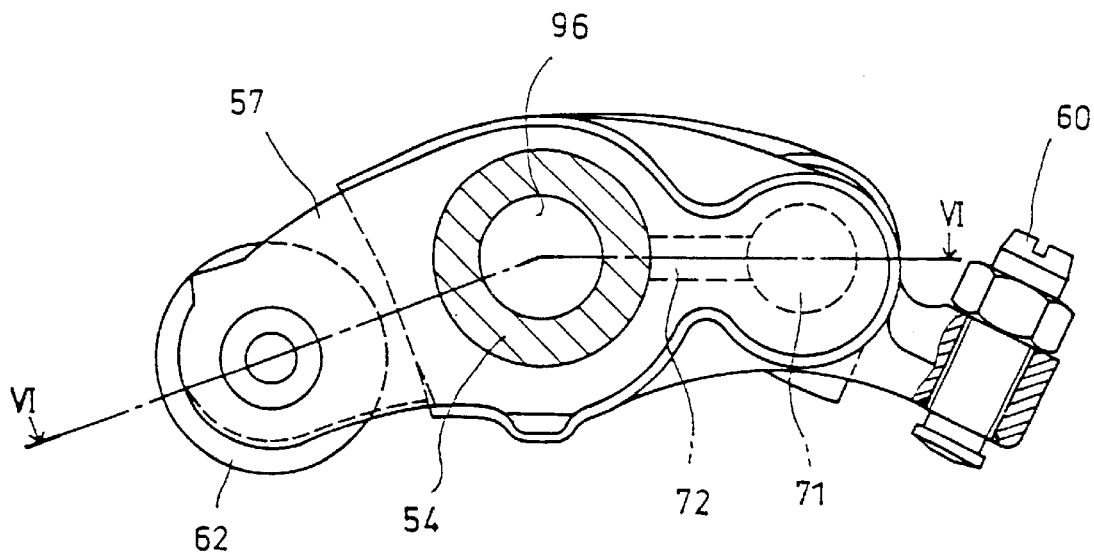
FIG. 5 is a view of an intake rocker arm taken in the direction of the arrow V in FIG. 4.
Figure 6:
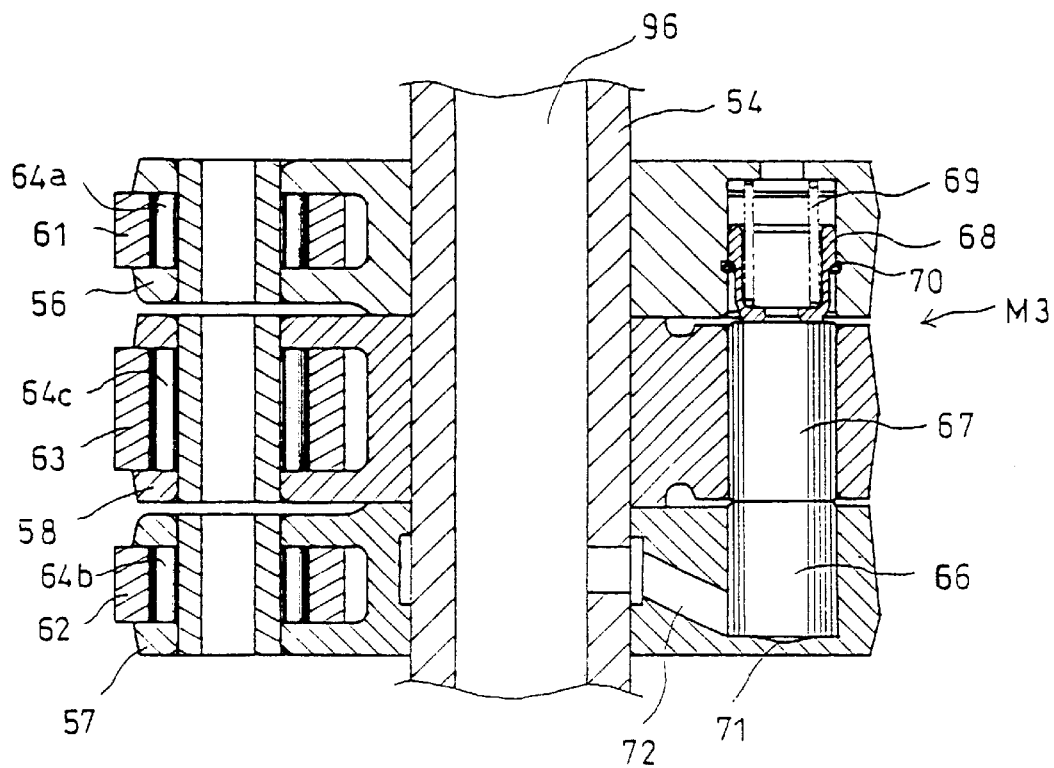
FIG. 6 is a sectional view taken on line VI—VI in FIG. 5.

Referring to FIGS. 4 to 6, the camshaft 49 is provided, for each cylinder 25, with a pair of exhaust cams 50, a pause cam 51 disposed between the exhaust cams 50, a low-speed intake cam 53 disposed below the pause cam 51, and a high-speed intake cam 53 disposed between the pause cam 51 and the low-speed intake cam 52. The pause cam 51 has a very low cam lobe, and a circular base part. The low-speed intake cam 52 has a cam lobe having a predetermined height greater than that of the pause cam 51 and a predetermined operating angle, and a circular base part. The high-speed intake cam 53 has a cam lobe having a height and an operating angle greater than those of the low-speed intake cam 52, and a circular base part of a diameter equal to those of the circular part of the pause cam 51 and the low-speed intake cam 52. Each exhaust cam 50 has a cam lobe having a predetermined height and a predetermined operating angle, and a circular base part.

A first intake rocker arm 56, a second intake rocker arm 57 and a third intake rocker arm 58 have middle parts supported on the intake rocker-arm shaft 54 disposed behind the camshaft 49 at positions corresponding to the pause cam 51, the low-speed intake cam 52 and the high-speed intake cam 53, respectively. The first intake rocker arm 56, the second intake rocker arm 57 and the third intake rocker arm 58 are able to rock on the intake rocker-arm shaft 54. Adjusting screws 60 are attached to the working ends of the first intake rocker arm 56 and the second intake rocker arm 57. The adjusting screws 60 are in contact with thee free ends of the stems of the first intake valve 33a and the second intake valve 33b pressed in the closing direction by valve springs 59. A first roller 61, a second roller 62 and a third roller 63 are supported by a plurality of rollers 61a, 64b and 64c on the contact ends of the intake rocker arms 56, 57 and 58 so as to be in rolling contact with the pause cam 51, the low-speed intake cam 52 and the high-speed intake cam 53, respectively. The third intake rocker arm 53 is pushed by a resilient device 65 (FIG. 2) provided with a spring such that the third roller 63 is in rolling contact with the high-speed intake cam 53.

Referring to FIGS. 5 and 6, a hydraulic rocker-arm connecting mechanism M3 capable of connecting and disconnecting the first intake rocker arm 56, the second intake rocker arm 57 and the third intake rocker arm 58 is interposed between the intake rocker-arm shaft 54 and the working ends of the intake rocker arms 56 and 57 and between the intake rocker-arm shaft 54 and the working end of the third intake rocker arm 58. The rocker-arm connecting mechanism M3 includes a connecting piston 66 capable of connecting the second intake rocker arm 57 and the third intake rocker arm 58, a connecting pin 67 capable of connecting the first intake rocker arm 56 and the third intake rocker arm 58, a piston control member 68 for controlling the movement of the connecting piston 66 and the connecting pin 67, and a return spring 69 pushing the connecting piston 66 and the connecting pin 67 and the piston control member 68 in a disconnecting direction. The movement of the piston control member 68 toward the connecting pin 67 is limited by a stop ring 70.

The connecting piston 66 is slidably fitted in a bore formed in the second intake rocker arm 57 so as to define a pressure chamber 71 between one end of the connecting piston 66 and the second intake rocker arm 57. A connecting passage 72 connected to the pressure chamber 71 is formed in the second intake rocker arm 57. An intake-side oil passage 96 formed in the intake rocker-arm shaft 54 is connected to a working fluid line. The intake-side oil passage 96 is always connected through the connecting passage 72 to the pressure chamber 71 regardless of the rocking state of the second intake rocker arm 57.

The connecting pin 67 is fitted slidably in a bore formed in the third rocker arm 58 and has one end in contact with the other end of the connecting piston 66 and the other end in contact with the piston control member 68 having the shape of a bottomed cylinder. The piston control member 68 is fitted slidably in a bore formed in the first intake rocker arm 56. The return spring 69 is compressed between the first rocker arm 56 and the piston control member 68.

In the rocker-arm connecting mechanism M3, the connecting piston 66, the connecting pin 67 and the piston control member 68 are pushed by the resilience of the return spring 69 in the disconnecting direction when the pressure of the working fluid in the pressure chamber 71 is low. In this state, the surfaces of the connecting piston 66 and the connecting pin 67 in contact with each other are between the second intake rocker arm 57 and the third intake rocker arm 58, and the surfaces of the connecting pin 67 and the piston control member 68 in contact with each other are between the first intake rocker arm 56 and the third intake rocker arm 58. The connecting piston 66, the connecting pin 67 and the piston control member 68 are pushed in the connecting direction against the resilience of the return spring 69 when the pressure of the working fluid in the pressure chamber 71 is high. In this state, a part of the connecting piston 66 enters the bore of the third intake rocker arm 58, and a part of the connecting pin 67 enters the bore of the first intake rocker arm 56. Consequently, the first intake rocker arm 56, the second intake rocker arm 57 and the third intake rocker arm 58 are interlocked.

Thus, the valve-operation mode changing mechanism M2 includes the pause cam 51, the low-speed intake cam 52, the high-speed intake cam 53, the intake rocker arms 56, 57 and 58, and the rocker-arm connecting mechanism M3.

As shown in FIG. 4, the exhaust rocker-arm shaft 55 is disposed behind the camshaft 49. A first exhaust rocker arm 73 and a second exhaust rocker arm 74 have middle parts pivotally supported on the exhaust rocker-arm shaft 55 at positions corresponding to the exhaust cams 50. Adjusting screws 76 are attached to the working ends of the first exhaust rocker arm 73 and the second exhaust rocker arm 74. The adjusting screws 76 are in contact with the free ends of the stems of the first exhaust valve 34a and the second exhaust valve 34b pressed in the closing direction by valve springs 75. A first roller 77 and a second roller 78 are supported by a plurality of rollers on the contact ends of the exhaust rocker arms 73 and 74 so as to be in rolling contact with the exhaust cams 50, respectively.

Referring to FIGS. 2 and 3, a fuel injector F (FIG. 3), i.e., a fuel supply device that jets a liquid fuel, is disposed at the downstream end of the intake manifold. Air for combustion is taken in through an intake system including an air inlet 8a formed in the engine cover 8, a duct 79 disposed inside the engine cover 8, an intake silencer 80, a throttle body 81, an intake resonator 82 and the intake manifold into the intake port 31. The air is mixed with the fuel injected by the fuel injector F to produce an air-fuel mixture in the intake port 31, and the air-fuel mixture is sucked into the combustion chamber 30. Air passages for carrying air for combustion extending between the intake system and the intake port 31 form an air intake passage.

A fuel controller, not shown, calculates a quantity of the fuel to be injected by the fuel injector F on the basis of engine speed, throttle valve opening, boost pressure, cooling water temperature and such measured by sensors and indicating the operating condition of the internal combustion engine, and provides a fuel injector drive signal to drive the fuel injector F for fuel injection. As shown in FIG. 3, the fuel injector F injects the fuel toward the upper intake opening 31U and the lower intake opening 31L.

The down stream opening 32d at the downstream end, with respect to the flowing direction of the exhaust gas, of the exhaust port 32 terminating in the pair of exhaust openings 32U and 32L is connected to the upstream opening of an exhaust manifold. The exhaust gas exhausted from each combustion chamber 30 flows through an exhaust system including the exhaust port 32, the exhaust manifold, an exhaust pipe 83, the extension case 6 and the gear case 9, and is discharged through a discharge opening into water.

A flywheel 84 is fastened to a lower end part projecting down from the lower sealing cover 27 forming a part of the crank chamber 28 with bolts. The flange of a cylindrical spline piece 85 having a splined bore is fastened to the lower surface of the flywheel 84 with bolts. An externally splined upper end part of the drive shaft 14 is engaged in the splined bore of the spline piece 85. The flywheel 84 is held in a flywheel chamber 87. The flywheel chamber 87 is defined by the lower sealing cover 27, an upper wall including a part of the lower wall of the cylinder block 21 and a part of the lower wall of the crankcase 20, and a lower wall, i.e., the pump body 86a of an oil pump 86.

The pump body 86a is held between respective lower walls of the cylinder block 21 and the crankcase 20 forming a part of the lower wall of the engine unit 3, and the respective lower walls of the cylinder block 21 and the crankcase 20, and the pump body 86a are fastened to the mount case 4 with bolts.

A lubricating system included in the internal combustion engine 2 will be described with reference to FIGS. 7 to 11.

Figure 7:
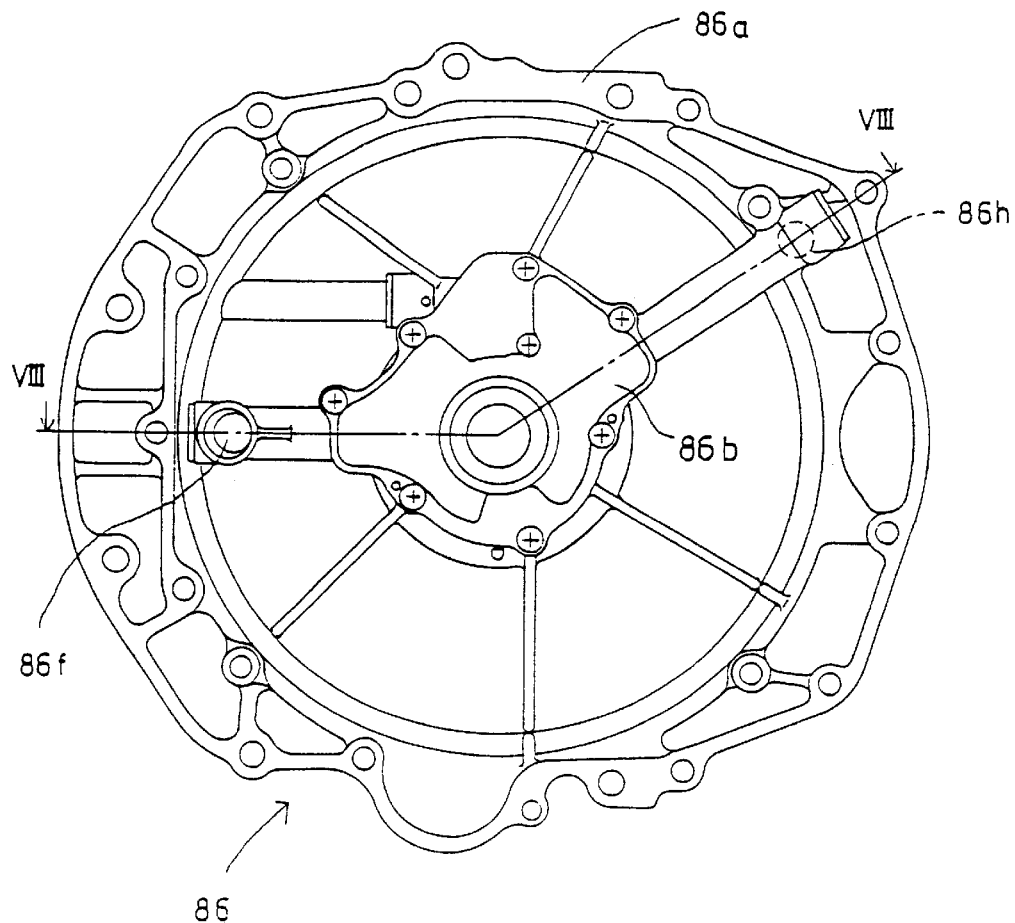
FIG. 7 is a bottom view of an oil pump included in the internal combustion engine included in the outboard motor shown in FIG. 1.
Figure 8:
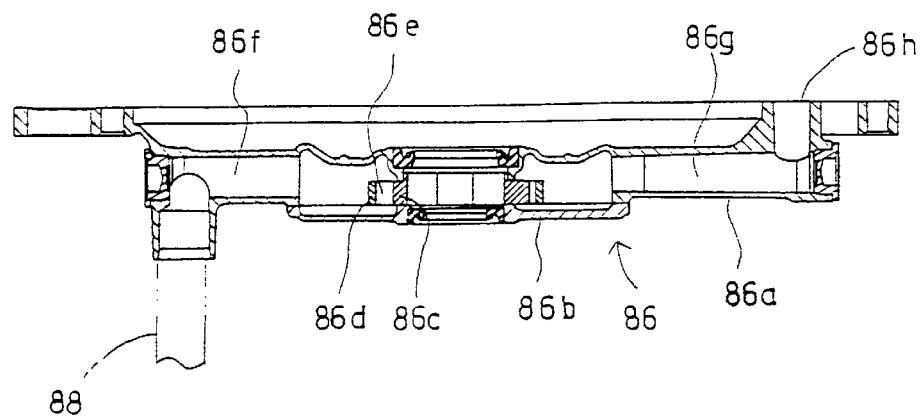
FIG. 8 is a sectional view taken on line VIII—VIII in FIG. 7.

Referring to FIGS. 7 and 8, the trochoid fuel pump 86 is disposed in a lower region of the flywheel chamber 87. The oil pump 86 includes the pump body 86a, a pump cover 86b fastened to the pump body 86a with screws, an inner rotor 86c connected to the spline piece 85 so as to be driven by the crankshaft 24, and an outer roller 86d engaged with the inner rotor 86c so as to revolve around the inner rotor 86c. The rotors 86c and 86d are held in a space defined by the pump body 86a and the pump cover 86b. A plurality of pumping chambers 86e are formed between the rotors 86c and 86d.

Figure 9:
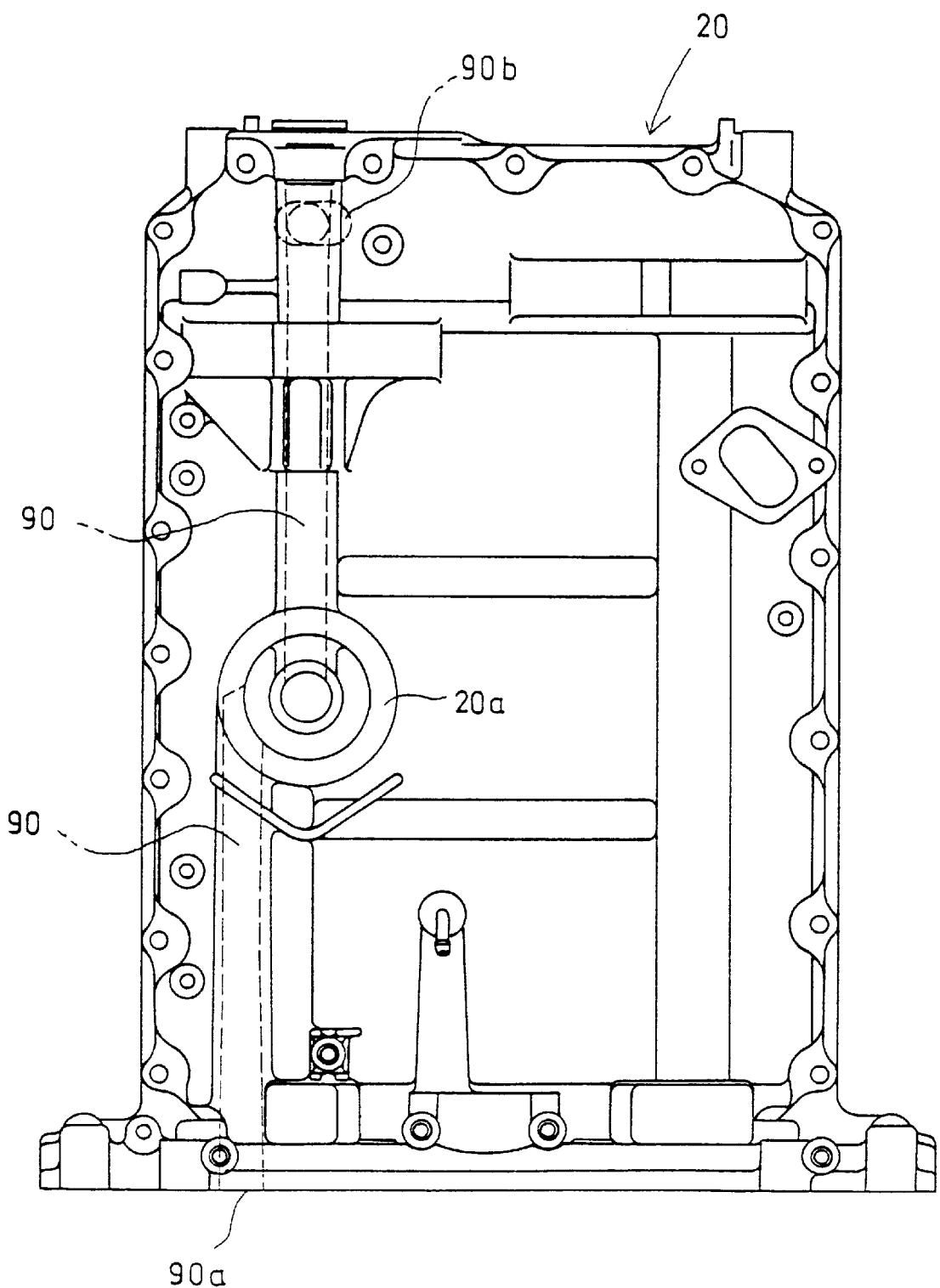
FIG. 9 is a front elevation of a crankcase included in the internal combustion engine included in the outboard motor shown in FIG. 1.
Figure 11:
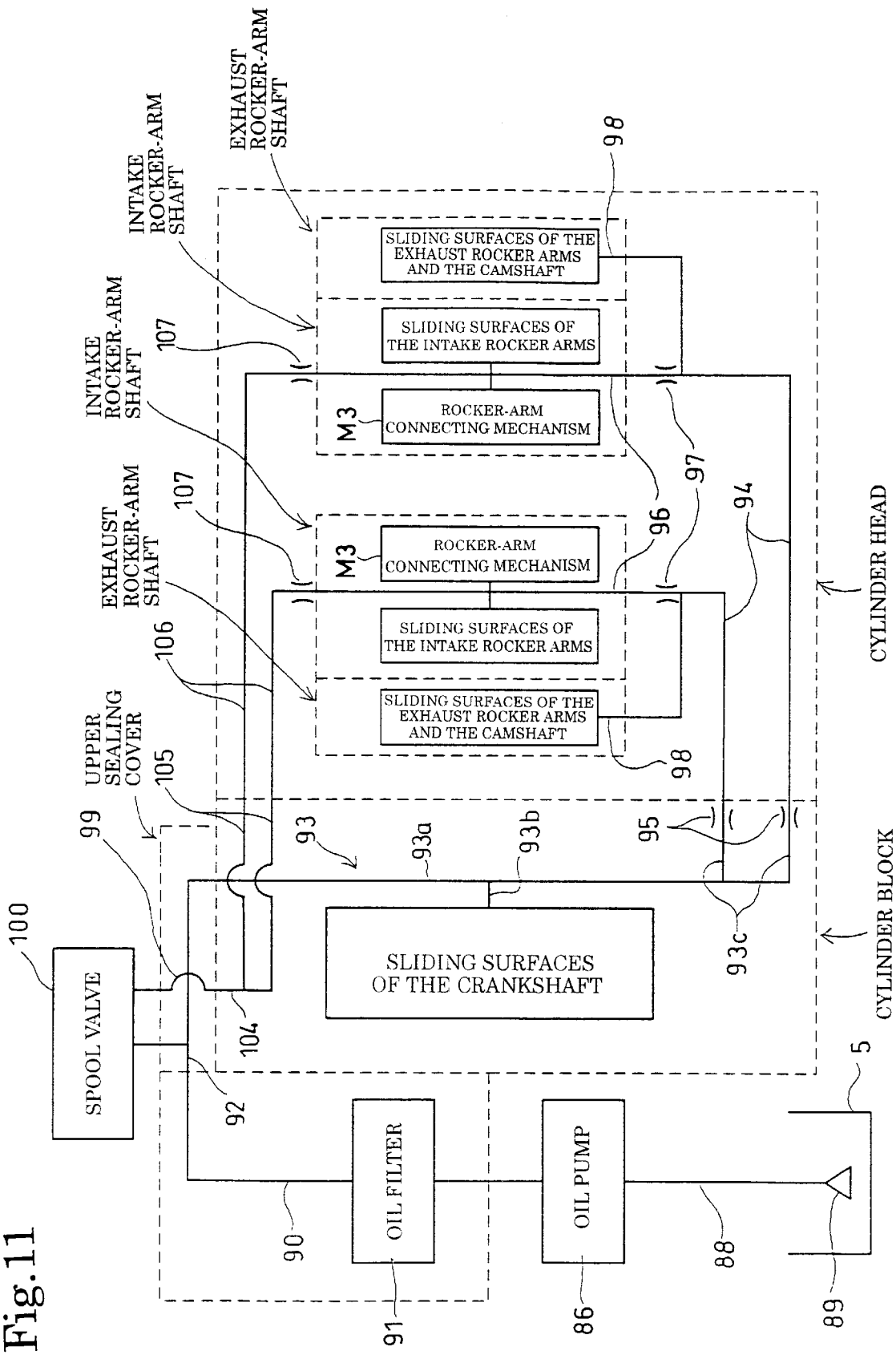
FIG. 11 is a diagram of a lubricating oil passage and a working fluid passage formed in the internal combustion engine included in the outboard motor shown in FIG. 1.

The pump body 86a is provided with a suction port 86f and a discharge port 86g. A suction pipe 88 (FIG. 2) extends vertically down ward and has an upper end connected to the suction port 86f, and a lower end connected to a strainer 89 (FIG. 11). As shown in FIG. 2 or 9, the outlet opening 86h of the discharge port 86g is connected to an inlet opening 90a of an oil passage 90 formed in the crankcase 20 and opening in the lower end surface of the crankcase 20. The upper outlet opening 90b of the oil passage 90 opens in a joining surface to which the upper sealing cover 26 is attached. An oil filter 91 is placed in the oil passage 90 and is fastened to an attaching seat 20a formed in the front surface of the front wall of the crankcase 20 forming the front wall of the engine unit 3. Foreign matters contained in a lubricating oil supplied into the oil passage 90 is filtered out by the oil filter 91 to supply the clean lubricating oil into the engine unit 3.

Figure 10:
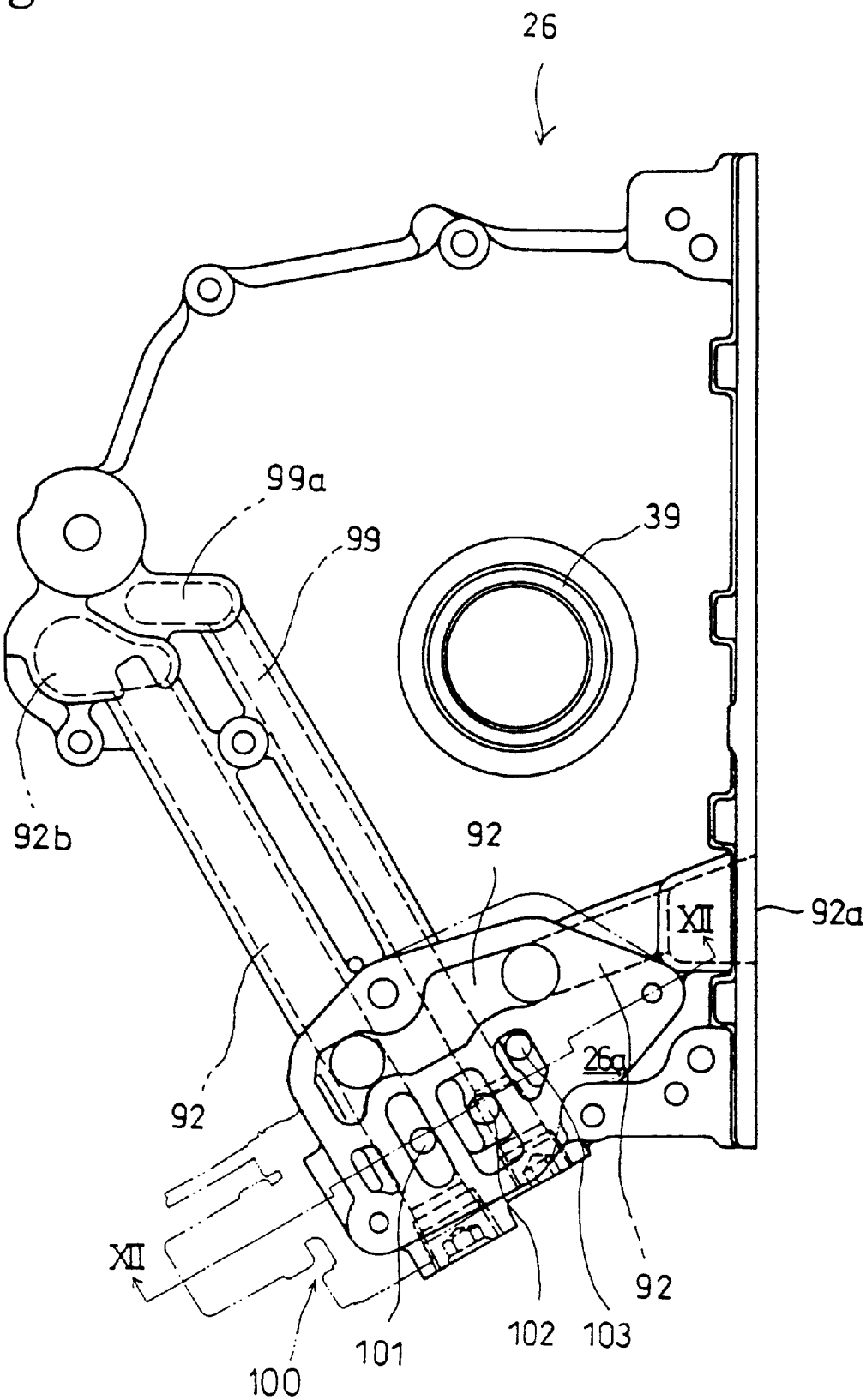
FIG. 10 is a top view of an upper sealing cover included in the internal combustion engine included in the outboard motor shown in FIG. 1.

As shown in FIG. 10, the oil passage 90 is connected to an inlet opening 92a (FIG. 2) of an oil passage 92 formed in the upper sealing cover 26 and opening in a joining surface joined to the crankcase 20. An outlet opening 92b of the oil passage 92 opening in a joining surface of the upper sealing cover 26 joined to the cylinder block 21 is connected to an inlet opening of an oil passage 93 (FIG. 11) formed in a joint of the banks extending in a V-shape of the cylinder block 21 where the cylinders 25 of the banks intersect each other, and opening in a joining surface joined to the upper sealing cover 26.

Referring to FIG. 11, the oil passage 93 formed in the cylinder block 21 has a vertical, straight main section 93a, four branch sections 93b branching from the main section 93a and respectively connected to the four journals of the crankshaft 24, and a pair of discharge sections 93c branching from the lower end of the main section 93a, respectively extending through orifices 95, opening in a joining surface of the cylinder block 21 joined to the cylinder head 22 and connected to a pair of oil passages 94 formed in the cylinder head 22 and opening in a joining surface of the cylinder head 22 joined to the cylinder block 21. Part of the lubricating oil supplied to the journals of the crankshaft 24 flows through oil holes formed in the crankshaft 24 and onto the outer surfaces of crankpins to lubricate the crankpins and the large ends of the connecting rods 37.

Each of the pair of oil passages 94 formed in the cylinder head 22 is connected through an orifice 97 to the intake-side oil passage 96 formed in the intake rocker-arm shaft 54 of each bank. Each of the pair of oil passages 94 is connected also to an exhaust-side oil passage 98 formed in the exhaust rocker-arm shaft 55. Part of the lubricating oil supplied through the oil passage 94 into the intake-side oil passage 96 is supplied as a low-pressure working fluid into the pressure chamber 71 of the rocker-arm connecting mechanism M3 and the rest of the lubricating oil is supplied for lubrication to the sliding surfaces of the intake rocker-arm shaft 54 and the intake rocker arms 56, 57 and 58, when an entrance port 101 and an exit port 102 formed in a mounting part 26a on which a spool valve 100, which will be described later, is mounted are closed.

Part of the lubricating oil supplied through the oil passage 94 to the exhaust-side oil passage 98 is supplied for lubrication to bearings supporting the journals of the camshaft 49 for rotation and the rest of the lubricating oil is supplied for lubrication to the sliding surfaces of the exhaust rocker-arm shaft 55 and the rocker arms 73 and 74. The orifices 95 and 97 determine the flow of the lubricating oil necessary for lubricating the valve train M1.

When the internal combustion engine 2 operates and the crankshaft 24 drives the oil pump 86, the lubricating oil contained in the oil pan 5 is sucked through the suction pipe 88 and the suction port 86f into the pump chamber 86e. Then, the lubricating oil discharged through the discharge port 86g is forced into the oil passage 90 of the crankcase 20 and flows into the oil filter 91. The clean lubricating oil thus filtered by the oil filter 91 flows through the oil passage 92 formed in the upper sealing cover 26 into the oil passage 93 of the cylinder block 21. Then, the lubricating oil flows from the oil passage 93 through the branch sections 93b to the journals of the crankshaft 24 to lubricate the journals. Part of the lubricating oil supplied to the journals of the crankshaft 24 lubricates the sliding surfaces of the crankpin and the large end of the connecting rod 37.

Part of the lubricating oil flowed from the oil passage 93 of the cylinder block 21 into the oil passage 94 of the cylinder head 22 flows through the intake-side oil passage 96 to the sliding surfaces of the intake rocker arms 56, 57 and 58, and the intake rocker-arm shaft 54 to lubricate the sliding surfaces. Part of the lubricating oil flowed into the intake-side oil passage 96 flows into the pressure chamber 71 of the rocker-arm connecting mechanism M3 to fill up the pressure chamber 71 with the low-pressure lubricating oil while the engine speed is in the low-speed range. Similarly, the rest of the lubricating oil supplied to the oil passage 94 of the cylinder head 22 flows into the exhaust-side oil passage 98. Part of the lubricating oil flowed into the exhaust-side oil passage 98 flows to the bearings of the camshaft 49 to lubricate the same, and the rest of the lubricating oil flows through the exhaust-side oil passage 98 to the sliding surfaces of the exhaust rocker arms 73 and 74, and the exhaust rocker-arm shaft 55 to lubricate the same. The lubricating oil lubricated the sliding surfaces of the crankshaft 24 and the valve train M1 flows through a return passage into the oil pan 5.

Referring to FIGS. 10 and 11, the upper sealing cover 26 forming a part of the upper wall of the engine unit 3 is provided with a working fluid passage 99, which is a section of a working fluid passage for carrying a working fluid to the rocker-arm connecting mechanism M3 of the valve-operation mode changing mechanism M2. The working fluid passage 99 is connected to and disconnected from the oil passage 92 of the upper sealing cover 26 by the spool valve 100 (pressure control valve), which is indicated by two-dot chain lines in FIG. 10, attached to the upper sealing cover 26. The spool valve 100 mounted on the mounting part 26a formed on the upper surface of the upper sealing cover 26 is operated according to engine speed measured by a sensor by control signals provided by a valve controller to connect and disconnect the entrance port 101, the exit port 102 and a drain port formed in the mounting part 26a. The spool valve 100 is attached beforehand to the upper sealing cover 26 to form a unit. The oil passage 92 of the upper sealing cover 26 can be connected to the oil passage 90 of the crankcase 20 and the oil passage 93 of the cylinder block 21 and a working fluid passage, which will be described later, provided with the spool valve 100 can be completed simply by attaching the upper sealing plate 26 to the cylinder block 21 and the crankcase 20. The spool valve 100 is a hydraulic valve controlled by a pilot pressure controlled by a solenoid valve.

Figure 12:
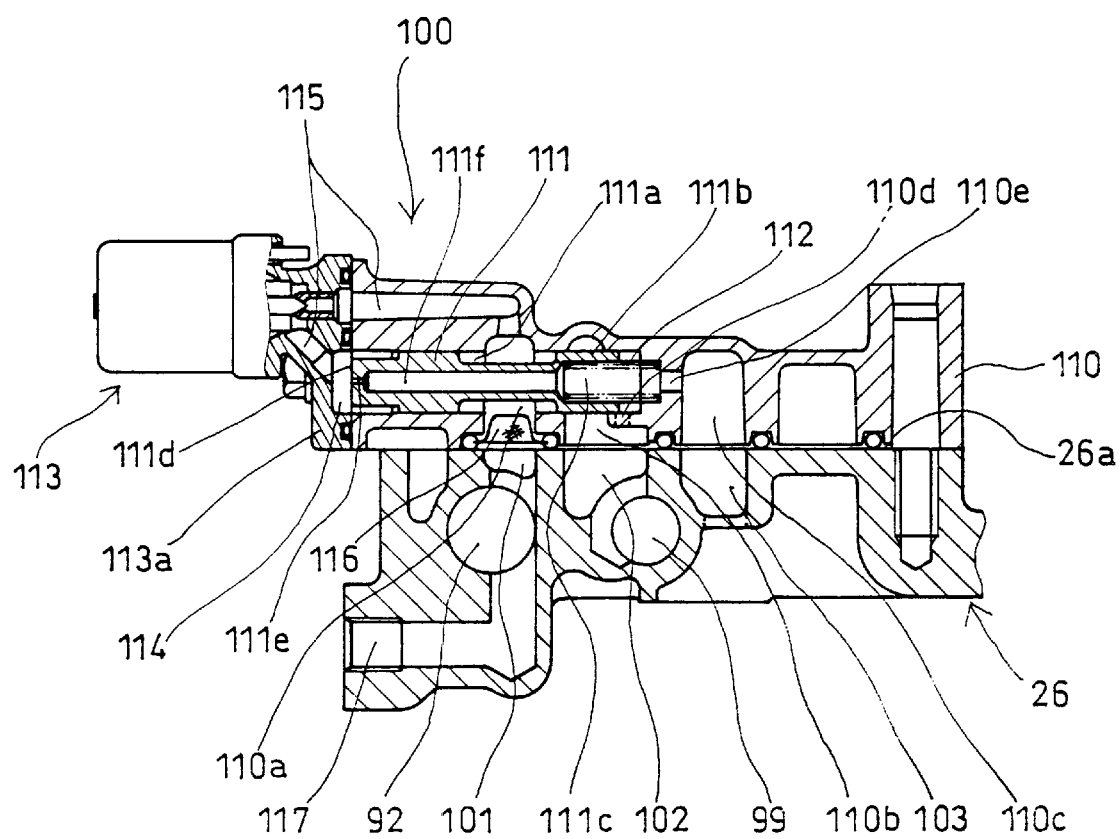
FIG. 12 is a sectional view taken on line XII—XII in FIG. 10.

The spool valve 100 will be explained hereinafter with reference to FIG. 12. The spool valve 100 has a housing 110, a pool 111 slidably fitted in the housing 110, a spring 112 pushing the spool 111 toward a closing position, and a normally closed solenoid valve 113 controlled by the valve controller. The spool 111 is provided with an annular groove 111a, a land 111b contiguous with the annular groove 111a, a spring-holding bore 111c holding the spring 112 therein, an end wall provided with an orifice 111e and having a pressure receiving surface 111d facing a pressure chamber 114 formed in the body 113a of the solenoid valve 113, and a first connecting hole 111f. The pressure chamber 114 communicates with the spring-holding bore 111c by means of the orifice 111e of the end wall and the first connecting hole 111f.

The housing 110 is provided with an inlet port 110a communicating with the oil passage 92 of the upper sealing cover 26 by means of the entrance port 101, an outlet port 110b communicating with the working fluid passage 99 of the upper sealing cover 26 by means of the exit port 102, a return port 110c connected to the drain port 103, a plurality of second connecting holes 110d interconnecting the outlet port 110b and the spring-holding bore 111c, and a third connecting hole 110e interconnecting the spring-holding bore 111c and the return port 110c. A pilot oil passage 115 is formed in the housing 110 and the valve body 113a. The pilot oil passage 115 extends from the inlet port 110a through the valve body 113a to the pressure chamber 114 and is opened and closed by the solenoid valve 113. An oil filter 116 is disposed at the inlet port 110a. Indicated at 117 is a hole for holding an oil-pressure sensor.

When the engine speed is in the low-speed range below a predetermined engine speed, the valve controller gives a control signal to make the solenoid valve 113 close the pilot oil passage 115, the pilot oil drains away from the pressure chamber 114 through the orifice 111e. Consequently, a low oil pressure prevails in the pressure chamber 114 and the spool valve 100 is set in a low-pressure state, in which the spool 111 is at a closing position, the outlet port 110b is disconnected from the inlet port 110a by the land 111b, the second connecting holes 110d are connected through the spring-holding hole 111c and the third connecting hole 110e to the return port 110c, and a low oil pressure prevails in the oil passage 99 of the upper sealing cover 26. When the engine speed is in the high-speed range not lower than the predetermined engine speed, the valve controller gives a control signal to make the solenoid valve 113 open the pilot oil passage 115, and the pilot oil is supplied into the pressure chamber 114 at a supply rate exceeding a drain rate at which the pilot oil is drained from the pressure chamber 114 through the orifice 111e to increase the pressure in the pressure chamber 114. Consequently, the spool 111 is moved against the resilience of the spring 112 to set the spool valve 100 in a high-pressure state. In this state, the spool 111 is at an opening position, the outlet port 110b is connected to the inlet port 110a by the annular groove 111a, and the land 111b closes the connecting hole 110d to disconnect the outlet port 110b from the return port 110c. Consequently, the pressure of oil in the oil passage 99 of the upper sealing cover 26 increases.

Referring again to FIGS. 10 and 11, the outlet opening 99a of the oil passage 99 opening in the joining surface of the upper sealing cover 26 joined to the cylinder block 21 is connected to the inlet opening of an oil passage 104 opening in the joining surface of the cylinder block 21 joined to the upper sealing cover 26. As shown in FIG. 11, the oil passage 104 of the cylinder block 21 branches into a pair of branch oil passages 105 in the cylinder block 21. The branch oil passages 105 open in a joining surface joined to the cylinder head 22, and a connected to a pair of oil passages 106 formed in the cylinder head 22 and opening in a joining surface joined to the cylinder block 21, respectively. The oil passages 106 of the cylinder head 22 are connected through orifices 107 to the intake-side oil passages 96 of the banks, respectively. The oil passage 99 of the upper sealing cover 26, the oil passage 104 of the cylinder block 21, the pair of branch oil passages 105 of the cylinder block 21, and the pair of oil passages 106 of the cylinder head 22 constitute a hydraulic circuit through which the working fluid is supplied to the rocker-arm connecting mechanism M3.

When the engine speed is in the low-speed range below the predetermined engine speed, the spool valve 100 is set in the low-pressure state, in which the drain port 103 opening into the crank chamber 28 is connected to the exit port 102 connected to the oil passage 99 of the upper sealing cover 26 through the annular groove 111a of the spool 111 of the spool valve 100, the inlet port 101 connected to the oil passage 92 of the upper sealing cover 26 is disconnected fro the outlet port by the land 111b of the spool 111 of the spool valve 100, and the oil is discharged from the hydraulic circuit into the crank chamber 28. Consequently, the pressure in the hydraulic circuit drops and the pressure in the pressure chamber 71 of the rocker-arm connecting mechanism M3 drops. However, the pressure chamber 71 is maintained at a low pressure by the lubricating oil supplied thereto through the oil passage 94 of the cylinder head 22. When the engine speed is in the high-speed range not lower than the predetermined engine speed, the spool valve 100 is set in the high-pressure state, in which the entrance port 101 and the exit port 102 are connected through the annular groove 111a of the spool 111 of the spool valve 100, the exit port 102 is disconnected from the drain port 103 by the land 111b of the spool 111 of the spool valve 100, the lubricating oil is supplied through the oil passage 92 of the upper sealing cover 26 into the hydraulic circuit, and the high-pressure oil is supplied into the pressure chamber 71. The orifice 107 prevents the flow of the oil from the intake-side oil passage 92 through the drain port at an excessively high flow rate.

The operation of the valve-operation mode changing mechanism M2 will be described hereinafter.

While the internal combustion engine 2 is operating at an engine speed in the low-speed range, the valve controller gives a control signal to make the spool valve 100 connect the exit port 102 to the drain port 103. Consequently, the pressure in the pressure chamber 71 of the rocker-arm connecting mechanism M3 drops, and the connecting piston 66 and the piston control member 68 of the rocker-arm connecting mechanism M3 are moved to disconnecting positions by the resilience of the return spring 69 as shown in FIG. 6. Thus, the intake rocker arms 56, 57 and 58 are disconnected from each other, the operation of the first intake valve 33a is paused substantially, the first intake valve 33a is held in a substantially closed state in which the first intake valve 33a is opened slightly according to the cam lobe of the pause cam 51 by the first intake rocker arm 56 provided with the first roller 61 in rolling contact with the pause cam 51, and the second intake valve 33b is operated for opening and closing operation by the second intake rocker arm 57 provided with the second roller 62 in rolling contact with the low-speed intake cam 52. Meanwhile, the third rocker arm 58 provided with the third roller 63 in rolling contact with the high-speed intake cam 53 rocks idly independent of the operation of the intake valves 33a and 33b, and the exhaust valves 34a and 34b are driven for opening and closing operation by the exhaust rocker arms 73 and 74 provided with the rollers 77 and 78 in rolling contact with the exhaust cams 50. Thus, while the internal combustion engine 2 is operating at engine speeds in the low-speed range, the first intake valve 33a is in a substantially paused state, the upper intake opening 31U is kept substantially closed, and the second intake valve 33b is driven for opening and closing the lower intake opening 31L by a lift, at opening and closing times and for an opening period suitable for operation at engine speeds in the low speed range. The air-fuel mixture flowed through the lower intake opening 31L into the combustion chamber 30 generates intense swirls in the combustion chamber 30, whereby combustion is promoted to improve combustion efficiency.

Referring to FIG. 3, part of the fuel injected by the fuel injection valve F toward the upper intake opening 31U and the lower intake opening 31L while the internal combustion engine 2 is operating at a low engine speed in the low-speed range adheres to the respective inclined surfaces 31a1 and 31b1 of the upper branch section 31a and the lower branch section 31b. Since the velocity of air in the intake manifold is low while the engine speed is low, fuel droplets mixed in air tend to flow downward, and part of the fuel adhering to the wall surface of the intake port 31 including the surface 31a1 of the upper branch section 31a drops on to the lower part of the wall surface of the intake port 31. Consequently, a large quantity of the fuel tends to stay on a lower part of the wall surface of the intake port 31, as compared with the quantity of the stagnant fuel on an upper part of the wall surface of the intake port 31.

Since the opening and closing operation of the first intake valve 33a is paused and the upper intake opening 31U is kept substantially closed, part of the fuel adhering to the wall surface 31a1 of the upper branch section 31a flows through a small space between the upper intake opening 31U and the first intake valve 33a slightly opened by the cam lobe of the pause cam 50 into the combustion chamber 30, and part of the rest of the fuel adhering to the wall surface 31a1 collects in a lower part of the upper branch section 31a, part of the fuel collected in the lower part of the upper branch section 31a flows to the lower branch section 31b extending below the upper branch section 31a, and the fuel collected in the lower part of the branch section 31a can be easily sucked through the lower branch section 31b toward the lower intake opening 31L while the internal combustion engine 2 is in the suction stroke, the quantity of the stagnant fuel on the wall surface 31a1 of the upper branch section 31a is small as compared with that of the fuel that will stay on the wall surface 31b1 of the lower branch section 31b when the opening and closing operation of the second intake valve 33b for opening and closing the lower intake opening 31L is paused.

When the engine speed is increased to an engine speed in the high-speed range, the valve controller gives a control signal to the spool valve 100 to connect the exit port 102 and the entrance port 101. Consequently, the pressure in the pressure chamber of the rocker-arm connecting mechanism M3 rises, the connecting piston 66, the connecting pin 67 and the piston control member 68 are shifted to their connecting positions against the resilience of the return spring 69, so that the first intake rocker arm 56, the second intake rocker arm 57 and the third intake rocker arm 58 are interlocked for simultaneous operation. Thus, the rocking motion of the third intake rocker arm 58 provided with the third roller 63 in rolling contact with the high-speed intake cam 53 is transmitted to the first intake rocker arm 56 and the second intake rocker arm 57 to drive both the intake valves 33a and 33b for opening and closing operation by the third intake rocker arm 58. The cam lobe of the pause cam 51 and the nose of the low-speed intake cam 52 are separated from the rollers 61 and 62 of the intake rocker arms 56 and 57, and the pause cam 51 and the low-speed intake cam 52 idle. On the other hand, both the exhaust valves 34a and 34b are driven by the exhaust cams 50 for opening and closing operation similar to that when the internal combustion engine 2 is operating at engine speeds in the low-speed range. Therefore, when the internal combustion engine 2 is operating at engine speeds in the high-speed range, the first intake valve 33a and the second intake valve 33b operate at a lift suitable for high-speed operation and opens and closes both the intake openings 31U and 31L at opening and closing times for an opening period suitable for high-speed operation, so that the internal combustion engine can operate at a high volumetric efficiency, the fuel jetted toward the intake openings 31U and 31L can be satisfactorily mixed with air to supply a homogeneous air-fuel mixture into the combustion chamber 30, so that the internal combustion engine 2 is able to produce a high output power in the high-seed range.

Part of the fuel injected by the fuel injection valve F toward the upper intake opening 31U and the lower intake opening 31L while the internal combustion engine 2 is operating at a high engine speed in the high-speed range adheres to the respective inclined surfaces 31a1 and 31b1 of the upper branch section 31a and the lower branch section 31b. Since both the first intake valve 33a and the second intake valve 33b are being operated for opening and closing operation and the velocity of air in the intake manifold is high while the engine speed is high, most part of the fuel adhering to the wall surfaces 31a1 and 31b1 are sucked through the intake openings 31U and 31L into the combustion chamber 30 and only a very small quantity of the fuel remains on the wall surfaces 31a1 and 31b1. The function and effect of the embodiment thus constituted will be described hereinafter.

While the internal combustion engine 2 is operating at engine speeds in the low-speed range, the opening and closing operation of the first intake valve 33a is paused by the valve-operation changing mechanism M2, the first intake opening 31U is kept virtually closed by the first intake valve 33a and the lower intake opening 31L is opened and closed by the second intake valve 33b and, consequently, swirls are generated in the combustion chamber 30. Although part of the fuel jetted into the intake port 31 by the fuel injection valve F flows into the upper branch section 31a and adheres to the wall surface 31a1, part of the fuel adhering to the wall surface 31a1 collects in a lower part of the upper branch section 31a, part of the fuel collected in the lower part of the upper branch section 31a flows down into the lower branch section 31b, and the fuel collected in the lower part of the upper branch section 31a is easily sucked through the lower branch section extending right below the upper branch section 31a and the lower intake opening 31L opened by the second intake valve 33b, while the internal combustion engine 2 is in the suction stroke. Therefore, the quantity of the stagnant fuel on the wall surface of the upper branch section 31a is small as compared with that of the fuel that will stay on the wall surface of the lower branch section 31b when the opening and closing operation of the second intake valve 33b for opening and closing the lower intake opening 31L is paused. Moreover, although a large quantity of the fuel tends to adhere to a lower part of the wall surface of the intake port 31, the fuel adhering to the lower part of the wall surface of the intake port 31 is sucked through the lower intake opening 31L into the combustion chamber 30 and hence the quantity of the fuel that remains on the wall surface of the intake port 31 is reduced.

Consequently, the quantity of the stagnant fuel on the wall surface 31a1 of the upper branch section 31a while during the operation of the internal combustion engine 2 at low engine speeds in the low-speed range, in which the operation of the first intake valve 33a is paused, is reduced, the variation of the air-fuel ratio caused by the stagnant fuel is suppressed and the stability of combustion is improved. Since the swirls improve combustion efficiency, a further lean air-fuel mixture can be used for combustion and hence fuel consumption rate can be improved.

Since both the first intake valve 33a and the second intake valve 33b are operated for the opening and closing operation while the internal combustion engine 2 is operating at engine speeds in the high-speed range, the fuel jetted toward the upper intake opening 31U and the lower intake opening 31L can be mixed with air to produce a homogeneous air-fuel mixture, so that the internal combustion engine 2 is able to produce a high output power.

Modifications of the foregoing embodiment will be described hereinafter.

Although the pause cam 51 of the embodiment has the cam lobe and the circular base part, a pause cam having only a circular base part may be employed. When a pause cam having only a circular base part is employed, the ratio of the quantity of part of the fuel jetted toward the upper intake opening 31U to that of all the fuel injected by the fuel injection valve F may be reduced to reduce the quantity of the stagnant fuel on the wall surface 31a1 of the upper branch section 31a.

Although the foregoing embodiment is provided with the fuel injection valve F attached to the intake manifold as a fuel supply device for supplying the fuel into the intake passage including the intake port 31, a carburetor may be used instead of the fuel injection valve F, and the carburetor may be disposed on the upstream side of the intake manifold. Although the foregoing embodiment is provided with the valve-operation mode changing mechanism in combination with only the intake side, valve-operation mode changing mechanisms may be combined with both the intake and the exhaust side. Although the invention has been described as applied to a multicylinder V internal combustion engine, the present invention is applicable to multicylinder internal combustion engines other than the multicylinder V internal combustion engine, and to single-cylinder internal combustion engines.

What is claimed is:

1. An outboard motor provided with an internal combustion engine comprising:
   a vertical crankshaft;
   a cylinder head provided, for one combustion chamber, with an intake port terminating in a pair of intake openings, and an exhaust port terminating in exhaust openings;
   a pair of intake valves for opening and closing the pair of intake openings;
   a pair of exhaust valves for opening and closing the exhaust openings;
   a valve train for operating the pair of intake valves and the pair of exhaust valves for opening and closing operation; and
   a fuel supply device for supplying a liquid fuel into an air intake passage connected to the pair of intake openings;
   wherein the intake port has a main section, an upper branch section branching from a downstream end of the main section, and a lower branch section branching from the downstream end of the main section and extending below the upper branch section; the pair of intake openings are an upper intake opening of the upper branch section, and a lower intake opening of the lower branch section, respectively; the pair of intake valves are a first intake valve for opening and closing the upper intake opening, and a second intake valve for opening and closing the lower intake opening, respectively; the valve train includes a valve-operation mode changing mechanism capable of changing the respective operating modes of the first and the second intake valve according to engine speed; and the valve-operation mode changing mechanism has a mode selecting system for making the valve-operation mode changing mechanism pause the opening and closing operation of the first intake valve, hold the first intake valve at its closed position and operate the second intake valve for opening and closing operation while the internal combustion engine is operating at engine speeds in a low-speed range.

2. The outboard motor according to claim 1, wherein an upstream projecting partition wall is formed between the upper branch section and the lower branch section of the intake port.

3. The outboard motor according to claim 2, wherein the partition wall has inclined upper and lower surfaces.

4. The outboard motor according to claim 1, wherein valve train includes: a first rocker arm for opening and closing the first intake valve, and a second rocker arm for opening and closing the second intake valve; the mode selecting system interlocks the first rocker arm and the second rocker arm so that the first rocker arm and the second rocker arm operate synchronously for opening and closing operation while the internal combustion engine is operating at engine speeds in a high-speed range, and the first rocker arm and the second rocker arm are disconnected to enable the first rocker arm to pause the opening and closing operation of the first intake valve independently of the operation of the second rocker arm while the internal combustion engine is operating at engine speeds in a low-speed range.

5. The outboard motor according to claim 4 including a mode selecting means which can be set in either a high-speed mode selecting state for a high-speed range for high engine speeds or a low-speed mode selecting state for a low-speed range for low engine speeds according to the engine speed of the internal combustion engine, and an interlocking means capable of interlocking the first rocker arm and the second rocker arm when the mode selecting means is set in the low-speed mode selecting state.

* * * * *